United States Patent
Tseng et al.

(10) Patent No.: US 10,178,657 B2
(45) Date of Patent: Jan. 8, 2019

(54) METHOD AND APPARATUS FOR RECONFIGURING SPS (SEMI-PERSISTENT) OPERATION IN A WIRELESS COMMUNICATION SYSTEM

(71) Applicant: INNOVATIVE SONIC CORPORATION, Taipei (TW)

(72) Inventors: Li-Chih Tseng, Taipei (TW); Ko-Chiang Lin, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 283 days.

(21) Appl. No.: 13/688,828

(22) Filed: Nov. 29, 2012

(65) Prior Publication Data

US 2013/0142140 A1 Jun. 6, 2013

Related U.S. Application Data

(60) Provisional application No. 61/566,245, filed on Dec. 2, 2011.

(51) Int. Cl.
*H04W 72/04* (2009.01)
*H04W 76/20* (2018.01)
*H04W 72/12* (2009.01)

(52) U.S. Cl.
CPC ......... *H04W 72/042* (2013.01); *H04W 76/20* (2018.02); *H04W 72/1278* (2013.01)

(58) Field of Classification Search
CPC ........... H04W 72/042; H04W 72/1278; H04W 72/12; H04W 72/04; H04L 1/1896

(Continued)

(56) References Cited

U.S. PATENT DOCUMENTS

2010/0074231 A1* 3/2010 Hsu .................. H04W 72/1284
370/336
2010/0113058 A1* 5/2010 Wu ..................... H04W 72/02
455/452.1

(Continued)

FOREIGN PATENT DOCUMENTS

EP 2182763 A1 5/2010

OTHER PUBLICATIONS

Office Action on corresponding foreign application (JP 2012-262207) dated Jan. 28, 2014.

(Continued)

*Primary Examiner* — Charles C Jiang
*Assistant Examiner* — Will Lin
(74) *Attorney, Agent, or Firm* — Blue Capital Law Firm, P.C.

(57) ABSTRACT

A method and apparatus are disclosed for improving SPS operation in a wireless communication system. The method includes configuring an user equipment (UE) with a downlink (DL) assignment or an uplink (UL) grant through a PDCCH (Physical Downlink Control Channel) addressed by a SPS C-RNTI (Semi-Persistent Scheduling Cell Radio Network Temporary Identity). The method also includes receiving, at the UE, a reconfiguration message for a SPS (Semi-Persistent Scheduling) operation in a higher layer, such as a RRC (Radio Resource Control) layer. The method further includes reconfiguring, at the UE, the SPS operation based on the reconfiguration message if the reconfiguration message includes a release of the SPS operation.

20 Claims, 8 Drawing Sheets

(58) Field of Classification Search
USPC .................. 370/329, 315, 330, 335, 241
See application file for complete search history.

(56) References Cited

U.S. PATENT DOCUMENTS

| | | | |
|---|---|---|---|
| 2011/0103327 A1* | 5/2011 | Lee | H04W 48/12 370/329 |
| 2011/0105136 A1* | 5/2011 | Choi | 455/452.1 |
| 2011/0170500 A1* | 7/2011 | Kuo | H04W 72/042 370/329 |
| 2011/0223924 A1* | 9/2011 | Lohr | H04W 72/042 455/450 |
| 2012/0315878 A1* | 12/2012 | Deng | H04W 12/10 455/411 |
| 2013/0182679 A1* | 7/2013 | Seo | H04W 72/042 370/330 |
| 2014/0161111 A1* | 6/2014 | Kim | H04W 56/0005 370/336 |
| 2014/0286240 A1* | 9/2014 | Kim | H04W 56/0005 370/328 |

OTHER PUBLICATIONS

Office Action on corresponding CN Patent Application No. 201210507853.5 dated Jul. 5, 2016.

\* cited by examiner

METHOD AND APPARATUS FOR RECONFIGURING SPS (SEMI-PERSISTENT) OPERATION IN A WIRELESS COMMUNICATION SYSTEM

CROSS-REFERENCE TO RELATED APPLICATIONS

The present Application claims the benefit of U.S. Provisional Patent Application Ser. No. 61/566,245 filed on Dec. 2, 2011, the entire disclosure of which is incorporated herein by reference.

FIELD

This disclosure, generally relates to wireless communication networks, and more particularly, to a method and apparatus for reconfiguring SPS (Semi-Persistent) operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for improving SPS (Semi-Persistent Scheduling) operation in a wireless communication system. The method includes configuring a user equipment (UE) with a downlink (DL) assignment or an uplink (UL) grant through a PDCCH (Physical Downlink Control Channel) addressed by a SPS C-RNTI (Semi-Persistent Scheduling Cell Radio Network Temporary Identity). The method also includes receiving, at the UE, a reconfiguration message for a SPS operation in a higher layer, such as a RRC (Radio Resource Control) layer. The method further includes reconfiguring, at the UE, the SPS operation based on the reconfiguration message if the reconfiguration message includes a release of the SPS operation.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra. Mobile Broadband), WiMax, or some other modulation, techniques.

In particular, the exemplary wireless communication systems devices described below may be designed to support one or more standards such as the standard offered by a consortium named "3rd Generation Partnership Project" referred to herein as 3GPP, including Document Nos. TS 36.321 V10.3.0 (2011-09), "E-UTRA; MAC protocol specification"; TS 36.331 V10.3.0 (2011-09), "E-UTRA; RRC protocol specification"; R2.115891, "Details on SPS reconfiguration". Panasonic; R2-116392, "SPS reconfiguration", Huawei, HiSilicon, CATT, Nokia Siemens Networks, ZTE, MediaTek, Panasonic; R2-115786, "Discussion on SPS", CATT; and R2-115787, "Clarification on SPS", CATT. The standards and documents listed above are hereby expressly incorporated herein.

Figure 1:
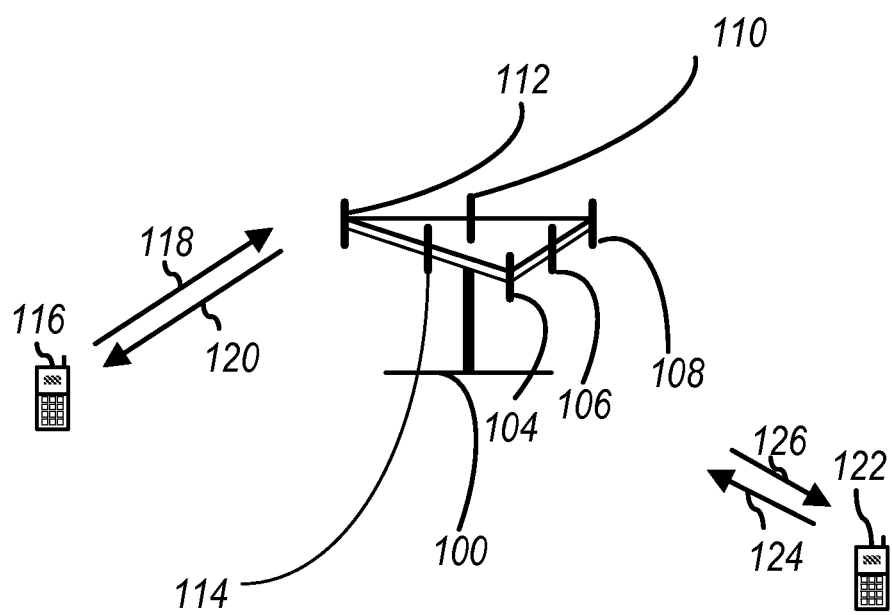
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown, for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas ad/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
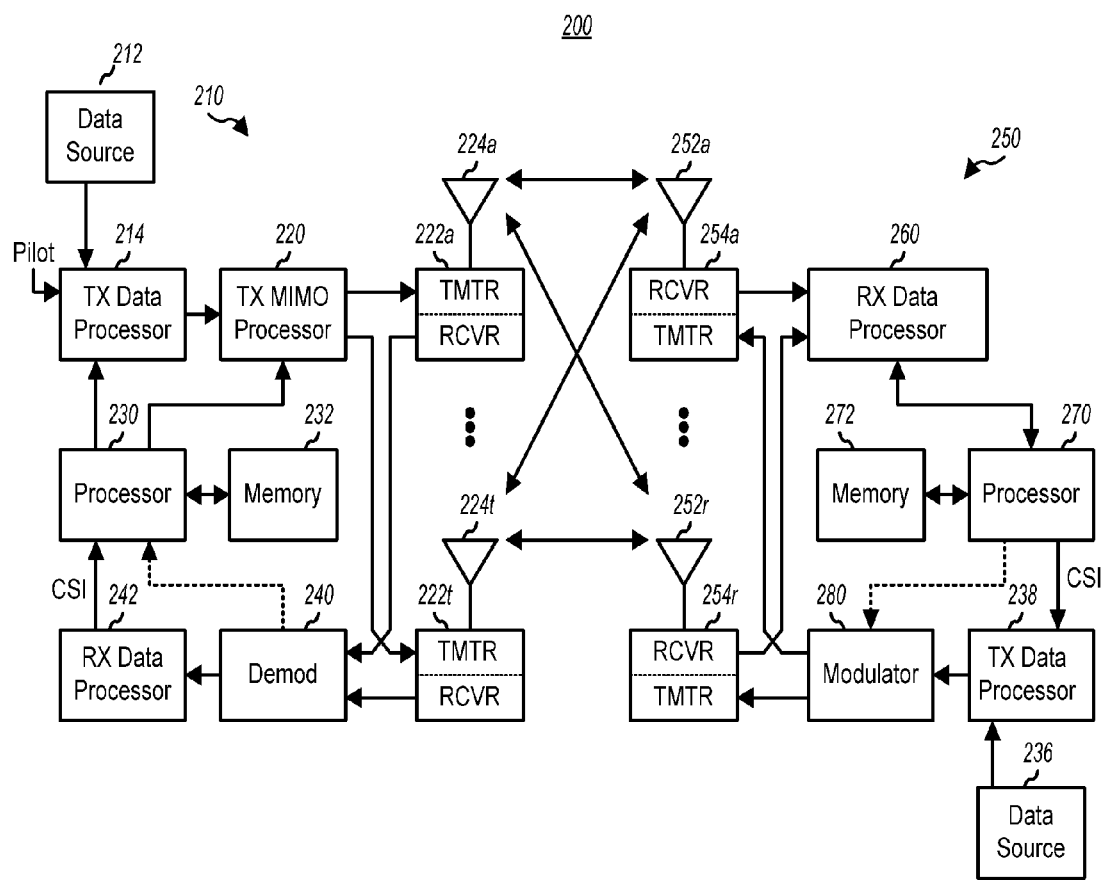
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions amplifies, filters, and upconverts) the analog signals to provide a modulated signal suitable for transmission over the MIMO channel $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received, signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve, link message transmitted by the receiver system 250. Processor 230 then determines which pre-coding matrix to use for determining the beamforming weights then processes the extracted message.

Figure 3:
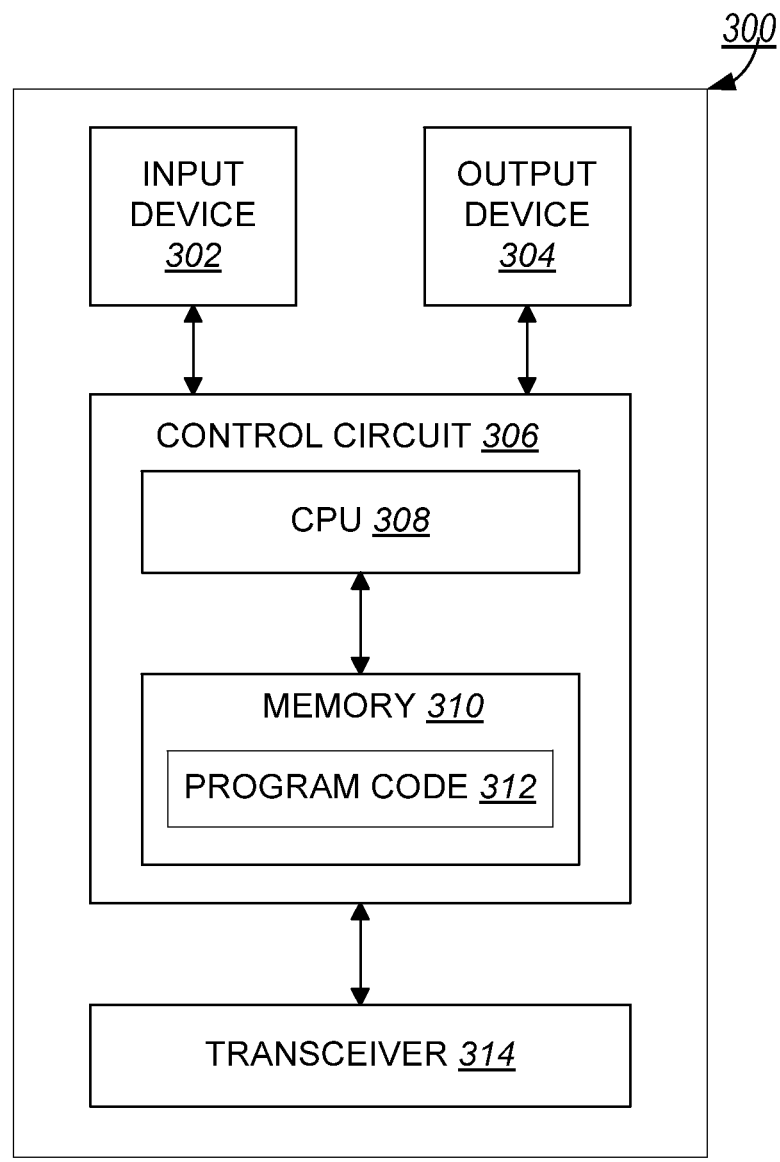
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
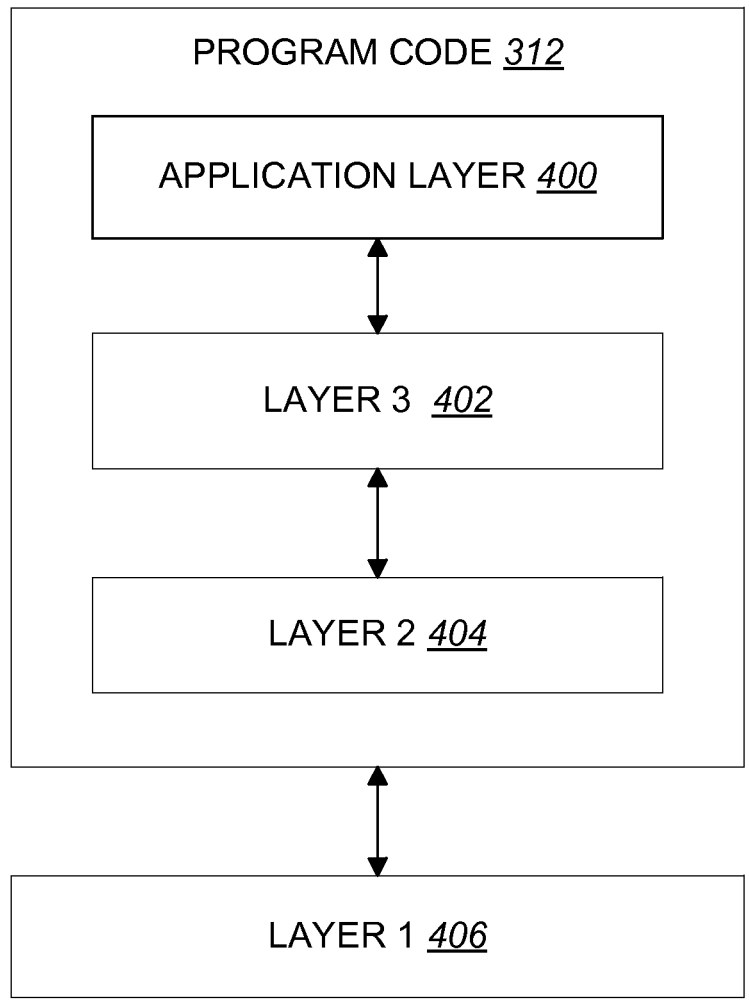
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The MAC specification (TS 36.321) describes the SPS (Semi-Persistent Scheduling) procedures as follows:
5.10 Semi-Persistent Scheduling
When Semi-Persistent Scheduling is enabled by RRC, the following information is provided [8]:
  Semi-Persistent Scheduling C-RNTI;
  Uplink Semi-Persistent Scheduling interval sermiPersistSchedIntervalUL and number of empty transmissions before implicit release implicitReleaseAfter, if Semi-Persistent Scheduling is enabled for the uplink;
  Whether twoIntervalsConfig is enabled or disabled for Uplink, only for TDD;
  Downlink Semi-Persistent Scheduling interval semiPersistSchedIntervalDL and number of configured HARQ processes for Semi-Persistent Scheduling numberOf-ConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the PCell only.

Semi-Persistent Scheduling is not supported for RN communication with the E-UTRAN in combination with an RN subframe configuration.

5.10.1 Downlink

After a Semi-Persistent downlink assignment is configured, the UE Shall consider that the assignment recurs in each subframe for which:

(10*SFN+subframe)=[(10*$SFN_{start\ time}$+$subframe_{start\ time}$)+N*semiPersistSchedIntervalDL] modulo 10240, for all N>0.

Where $SFN_{start\ time}$ and $subframe_{start\ time}$ are the SFN and subframe, respectively, at the time the configured downlink assignment were (re-)initialised.

5.10.2 Uplink

After a Semi-Persistent Scheduling uplink grant is configured, the UE shall:

if twoIntervalsConfig is enabled by upper layer:
  set the Subframe_Offset according to Table 7.4-1,
else:
  set Subframe_Offset to 0.
  consider that the grant recurs in each subframe for which:
    (10 SFN subframe)=[(10 $SFN_{start\ time}$+$subframe_{start\ time}$)+ N*semiPersistSchedIntervalUL+Subframe_Offset*(N modulo 2)] modulo 10240, for all N>0.

Where $SFN_{start\ time}$ and $Subframe_{start\ time}$ are the SFN and subframe, respectively, at the time the configured uplink grant were (re-)initialised.

The UE shall clear the configured uplink grant immediately after implicitReleaseAfter [8] number of consecutive new MAC PDUs each containing zero MAC SDUs have been provided by the Multiplexing and Assembly entity, on the Semi-Persistent Scheduling resource.

NOTE: Retransmissions for Semi-Persistent Scheduling can continue after clearing the configured uplink grant.

Furthermore, the RRC specification (TS 36.331) describes the SPS configuration information (SPS-Config) as follows:

SPS-Config

The IE SPS-Config is used to specify the semi-persistent Scheduling configuration.

| SPS-Config information element | | | |
|---|---|---|---|
| -- ASN1START | | | |
| SPS-Config ::= SEQUENCE { | | | |
|    semiPersistSchedC-RNTI | C-RNTI | OPTIONAL, | -- Need OR |
|    sps-ConfigDL | SPS-ConfigDL | OPTIONAL, | -- Need ON |
|    sps-ConfigUL | SPS-ConfigUL | OPTIONAL | -- Need ON |
| } | | | |
| SPS-ConfigDL ::= CHOICE{ | | | |
|    release | | NULL, | |
|    setup | | SEQUENCE { | |
|       [...] | | | |
|    } | | | |
| } | | | |

| SPS-Config information element |
|---|
| SPS-ConfigUL ::= CHOICE { |
|    release                                     NULL, |
|    setup                                         SEQUENCE { |
|       [...] |
|    } |
| } |
| -- ASN1STOP |

As seen, there are three kinds of SPS configuration information, including the SPS C-RNTI (Cell Radio Network Temporary Identity) element, the SPS DL (Down Link) element, and SPS UL (Uplink) element.

3GPP R2-115891 introduces the following issue of reconfiguring SPS

At RAN2#75 the UE behavior was discussed for the case that SPS reconfiguration, i.e. sps-Config, is received while SPS operation is activated. During offline discussions it was concluded that in order to support SPS reconfiguration while SPS is activated, the UE would need to remember the SFN and subframe of the SPS activation, i.e. SFN/subframe when SPS activation PDCCH was received. This contribution is further looking into the UE requirements which needs to be fulfilled in order to avoid misalignment between network and UE w.r.t. the calculation of the SPS occasions.

It further proposed that SPS reconfiguration (i.e., sps-Config) should not be supported when SPS is activated."

Also, 3GPP R2-116392 proposes that "except for handover, E-UTRAN does not reconfigure sps-Config when there is a configured downlink assignment or a configured uplink gram." In addition, 3GPP R2-115.786 and R2-115787 propose that "Semi-Persistent Scheduling reconfiguration by RRC should only be performed when there is no configured downlink assignment and configured uplink grant."

In general, when SPS is running or activated, it is not allowed to reconfigure sps-Config (i.e., SPS DL and UL configuration). However, SPS operation could be separated into two operations, DL SPS and UL SPS. If SPS reconfiguration procedure could be handled, it should be possible to reconfigure UL SPS when DL SPS is running or activated, and vice versa.

In particular, if DL and UL SPS operation could be used independently in different services, SPS in one direction for one service would need to be deactivated or released. In addition, SPS in the other direction for another service should be configurable.

3GPP R2-116392 proposes that "except for handover, E-UTRAN does not reconfigure sps-Config when there is a configured downlink assignment or a configured uplink grant." The general reason is to avoid possible mismatch of SPS occasions between the UE and eNB as discussed in 3GPP R2-116392 as follows:

SPS reconfiguration while SPS operation is activated, requires the UE to remember SFN/subframe of SPS activation and potentially also the number of SFN wrap around that happened between SPS activation and reconfiguration. To avoid potential mismatch between the eNB and UE, and to simplify implementation, SPS reconfiguration while SPS operation is activated should therefore be forbidden. Naturally this restriction does not apply to reconfiguration during handover since the MAC layer is reset at the same time.

However, sps-Config of RRC, configured DL assignment, and UL grant of MAC are handled on different layers, which may cause the eNB and the UE to be out of sync. As a result, in one situation, the eNB may think that DL SPS has been released, through a release of PDCCH SPS release while, the DL SPS is actually missing. In this situation, UE would ignore sps-Config, which may violate eNB scheduling and result in interference for other UEs.

Figure 5:
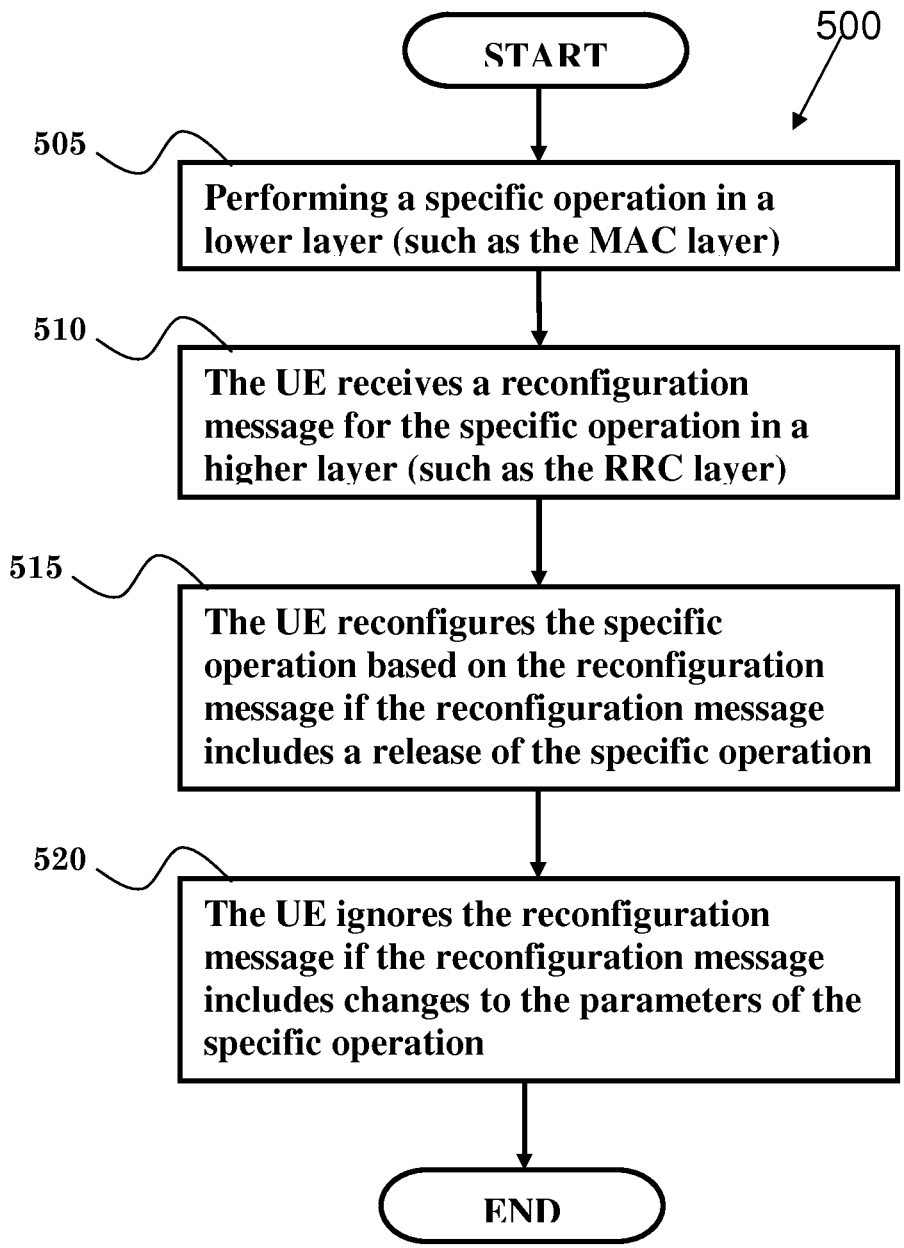
FIG. 5 is a flow chart according to one exemplary embodiment.

FIG. 5 illustrates an exemplary flowchart 500 in accordance with one embodiment. In step 505, a specific operation is performed in a lower layer, such as a MAC (Medium Access Control) layer. In step 510, the user equipment (UE) receives a reconfiguration message for the specific operation in a higher layer, such as a RRC (Radio Resource Control) layer. In step 515, the UE reconfigures the specific operation based on the reconfiguration message if the reconfiguration message includes a release of the specific operation. In step 520, the UE ignores the reconfiguration message if the reconfiguration message includes changes to parameters of the specific operation.

Referring back to FIGS. 3 and 4, the UE 300 includes a program code 312 stored in memory 310. In one embodiment, the CPU 308 could execute the program code 312 (i) to perform a specific operation in a lower layer, such as a MAC layer, (ii) to receive, at an UE, a reconfiguration message for the specific operation in a higher layer, such as a RRC layer, (iii) to reconfigure, at the UE, the specific operation based on the reconfiguration message if the reconfiguration message includes a release of the specific operation, and (iv) to ignore, at the UE, the reconfiguration message if the reconfiguration message includes changes to parameters of the specific operation. In addition, the CPU 308 can execute the program code 312 to perform all of the above-described actions and steps or others described herein.

Figure 6:
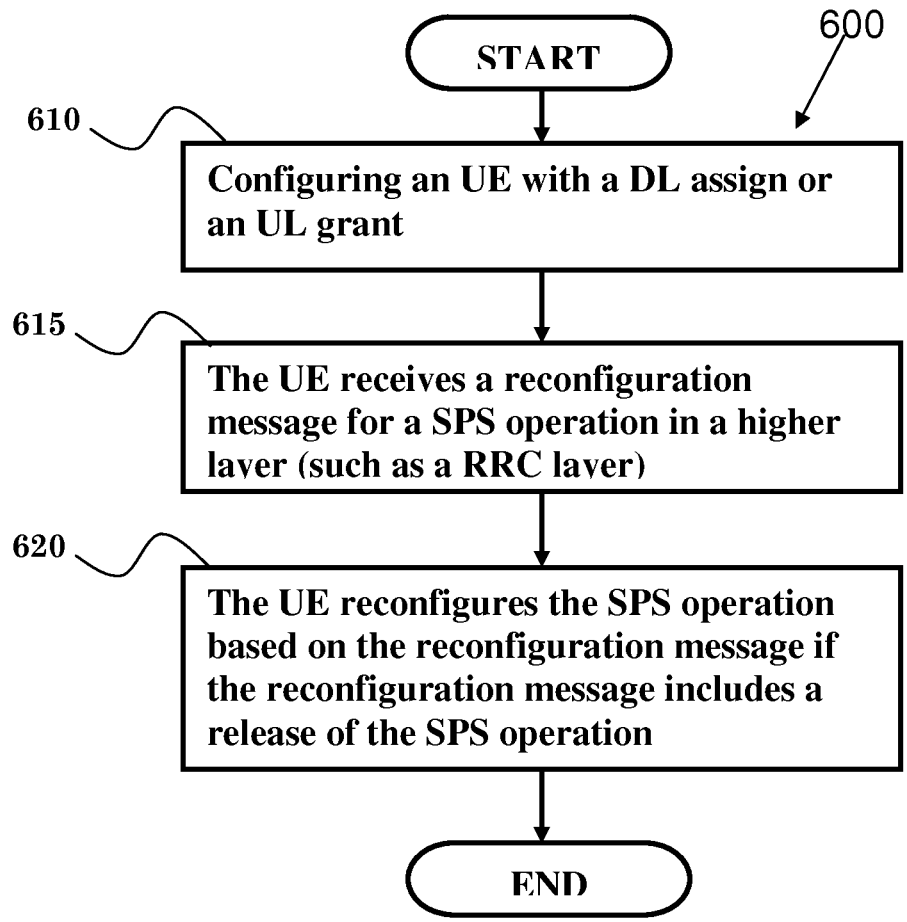
FIG. 6 is a flow chart according to one exemplary embodiment.

FIG. 6 illustrates an exemplary flowchart 600 in accordance with one embodiment. In step 610, an UE is configured with a downlink (DL) assignment or an uplink (UL) grant through a PDCCH (Physical Downlink Control Channel) addressed by a SPS RNTI (Semi-Persistent Scheduling Cell Radio Network Temporary Identity). In step 615, the UE receives a reconfiguration message for a SPS operation in a higher layer, such as a RRC layer. In step 620, the UE reconfigures the SPS operation based on the reconfiguration message if the message includes a release of the SPS operation. In one embodiment, the release of the SPS operation could include a release of the SPS C-RNTI, a sps-ConfigDL, and/or a sps-ConfigUL.

Referring back to FIGS. 3 and 4, the UE 300 includes a program code 312 stored in memory 310. In one embodiment, the CPU 308 could execute the program code 312 (i) to configure an UE with a DL assignment or an uplink UL grant through a PDCCH addressed by a SPS (ii) to receive, at the UE, a reconfiguration message for a SPS operation in a higher layer, such as a RRC layer, and (iii) to reconfigure, at the UP, the SPS operation based on the reconfiguration message if the reconfiguration message includes a release of the SPS operation.

Furthermore, in one embodiment, the UP could ignore the reconfiguration message if the reconfiguration message includes changes to parameters of the SPS operation or if the reconfiguration message does not include the release of the SPS operation. In this embodiment, the parameters of the SPS operation could include a SPS C-RNTI, a SPS interval, or a number of HARQ (Hybrid Automatic Repeat Request) processes used in the SPS operation.

Figure 7:
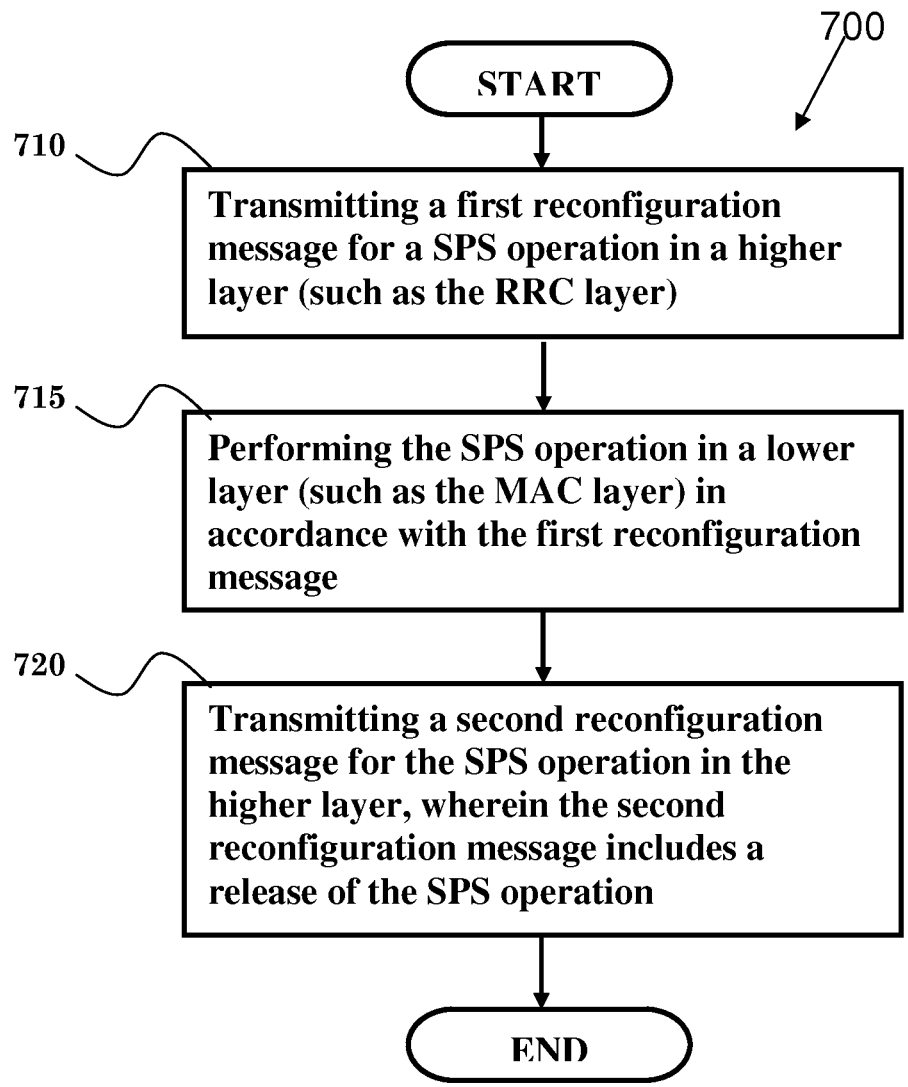
FIG. 7 is a flow chart according to one exemplary embodiment.

FIG. 7 illustrates an exemplary flowchart 700 in accordance with one embodiment. In step 710, a first reconfiguration message for a SPS operation is transmitted in a higher layer (such as the RRC layer). In step 715, the SPS operation is performed in a lower layer (such as the MAC layer) in accordance with the first reconfiguration message. In step 720, a second reconfiguration, message for the SPS operation is transmitted in the higher layer, wherein the second reconfiguration message includes a release of the SPS operation. In one embodiment, the release of the SPS operation includes a release of the SPS C-RNTI, a sps-ConfigDL, and/or a sps-ConfigUL.

Referring back to FIGS. 3 and 4, the UE 300 includes a program code 312 stored in memory 310. In one embodiment, the CPU 308 could execute the program code 312 (i) to transmit a first reconfiguration message for a SPS operation in a higher layer, such as the RRC layer, (ii) to perform the SPS operation in a lower layer, such as the MAC layer, according to the first reconfiguration message, and (iii) to transmit a second reconfiguration message for the SPS operation in the higher layer, wherein the second reconfiguration message includes a release of the SPS operation.

In one embodiment, the SPS operation would be stopped in the lower layer in accordance with the second reconfiguration message.

Figure 8:
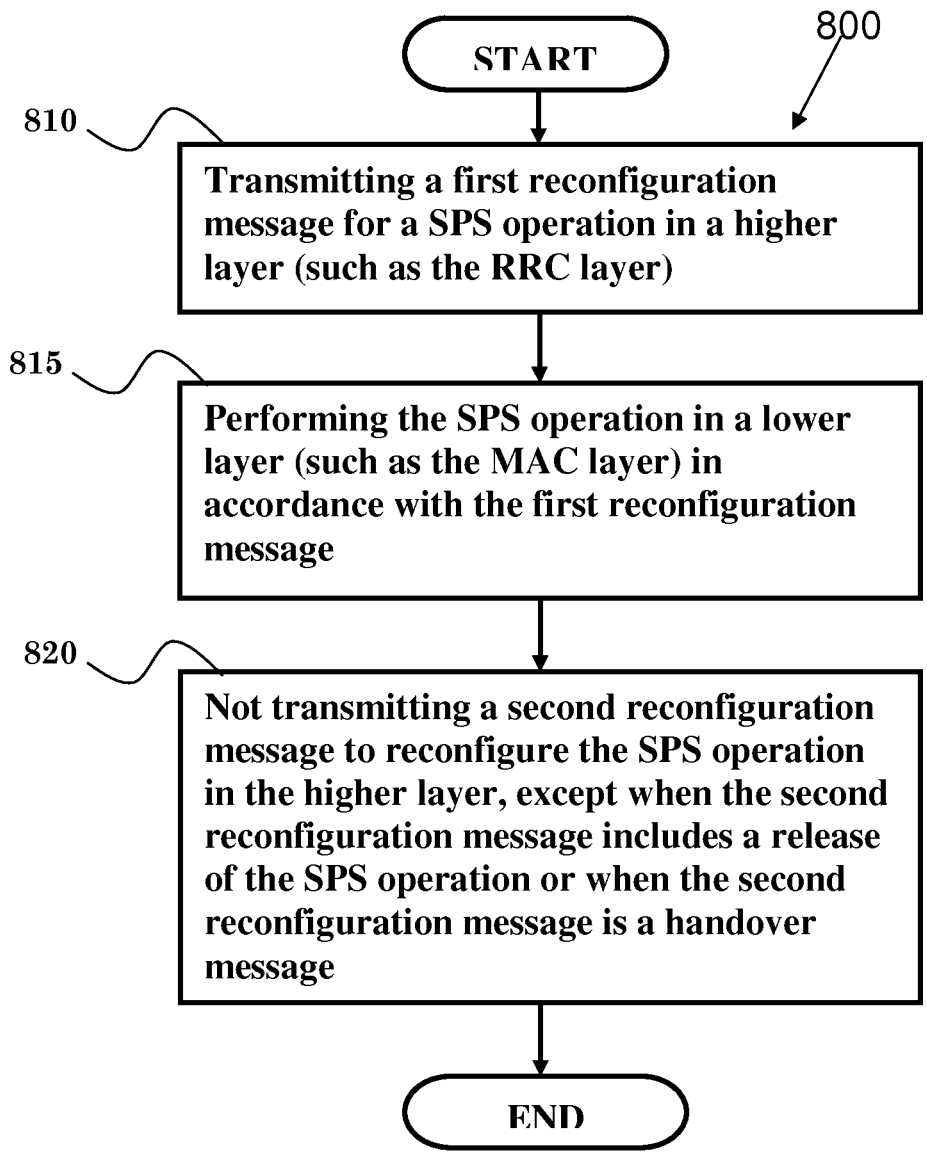
FIG. 8 is a flow chart according to one exemplary embodiment.

FIG. 8 illustrates an exemplary flowchart 800 in accordance with one embodiment. In step 810, a first reconfiguration message for a SPS operation is transmitted in a higher layer (such as the RRC layer) In step 815, the SPS operation is performed in a lower layer (such as the MAC layer) in accordance with the first reconfiguration message. In step 820, a second reconfiguration message to reconfigure the SPS operation is not transmitted in the higher layer, except when the second reconfiguration message includes a release of the SPS operation or when the second configuration message is a handover message. In other words, if the second reconfiguration message includes a release of the SPS operation or is a handover message, the second configuration message would be transmitted in the higher layer. Otherwise, the second reconfiguration message would not be transmitted. In one embodiment, the release of the SPS operation includes a release of the SPS C-RNTI, a sps-ConfigDL, and/or a sps-ConfigUL.

Referring back to FIGS. 3 and 4, the UE 300 includes a program code 312 stored in memory 310. In one embodiment, the CPU 308 could execute the program code 312 (i) to transmit a first reconfiguration message for a SPS operation in a higher layer, such as the RRC layer, (ii) to perform the SPS operation in a lower layer, such as the MAC layer, according to the first reconfiguration message, and (iii) to not transmit a second reconfiguration message to reconfigure the SPS operation in the higher layer, except when the second reconfiguration message, includes a release of the SPS operation or when the second configuration message is a handover message.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described, above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm, described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principle of the invention, and including such departures from the present disclosure as come within the known and customary practice within the art to which the invention pertains.

What is claimed is:

1. A method for handling reconfiguration messages in a wireless communication system, comprising:
    configuring an user equipment (UE) with a downlink (DL) assignment or an uplink (UL) grant through a PDCCH (Physical Downlink Control Channel) addressed by a SPS C-RNTI (Semi-Persistent Scheduling Cell Radio Network Temporary Identity);
    receiving, at the UE, a reconfiguration message for a SPS (Semi-Persistent Scheduling) operation in a higher layer;
    reconfiguring, at the UE, the SPS operation based on the reconfiguration message if the reconfiguration message includes a release of the SPS operation; and
    ignoring, at the UE, the reconfiguration message if the reconfiguration message includes changes to parameters of the SPS operation.

2. The method of claim 1, further comprises:
    ignoring, at the UE, the reconfiguration message if the reconfiguration message does not include the release of the SPS operation.

3. The method of claim 1, wherein the release of the SPS operation includes a release of the SPS C-RNTI, a sps-ConfigDL, and/or a sps-ConfigUL.

4. The method of claim 1, wherein the parameters of the SPS operation include a SPS C-RNTI, a SPS interval, or a number of HARQ (Hybrid Automatic Repeat Request) processes used in the SPS operation.

5. A user equipment (UE) for handling reconfiguration messages in a wireless communication system, the UE comprising:

a control circuit;
a processor installed in the control circuit;
a memory installed in the control circuit and operatively coupled to the processor;
wherein the processor is configured to execute a program code stored in memory to handle the reconfiguration messages by:
configuring, at the UE, with a downlink (DL) assignment or an uplink (UL) grant through a PDCCH (Physical Downlink Control Channel) addressed by a SPS C-RNTI (Semi-Persistent Scheduling Cell Radio Network Temporary Identity);
receiving, at the UE, a reconfiguration message for a SPS (Semi-Persistent Scheduling) operation in a higher layer;
reconfiguring, at the UE, the SPS operation based on the reconfiguration message if the reconfiguration message includes a release of the SPS operation; and
ignoring, at the UE, the reconfiguration message if the reconfiguration message includes changes to parameters of the SPS operation.

6. The UE of claim 5, wherein the processor is further configured to execute a program code stored in memory to handle the reconfiguration messages by:
ignoring, at the UE, the reconfiguration message if the reconfiguration message does not include the release of the SPS operation.

7. The UE of claim 5, wherein the release of the SPS operation includes a release of the SPS C-RNTI, a sps-ConfigDL, and/or a sps-ConfigUL.

8. The UE of claim 5, wherein the parameters of the SPS operation includes a SPS C-RNTI, a SPS interval, or a number of HARQ (Hybrid Automatic Repeat Request) processes used in the SPS operation.

9. A method for handling reconfiguration messages in a wireless communication system, comprising:
performing a specific operation in a lower layer;
receiving, at an user equipment (UE), a reconfiguration message for the specific operation in a higher layer;
reconfiguring, at the UE, the specific operation based on the reconfiguration message if the reconfiguration message includes a release of the specific operation; and
ignoring, at the UE, the reconfiguration message if the reconfiguration message includes changes to parameters of the specific operation.

10. A method for handling reconfiguration messages in a wireless communication system, comprising:
transmitting a first reconfiguration message for a SPS (Semi-Persistent Scheduling) operation in a higher layer;
performing the SPS operation in a lower layer according to the first reconfiguration message; and
transmitting a second reconfiguration message for the SPS operation in the higher layer, if the second reconfiguration message includes a release of the SPS operation despite of whether the second reconfiguration message, which includes the release of the SPS operation, is a handover message or not.

11. The method of claim 10, further comprises:
stopping the SPS operation in the lower layer according to the second reconfiguration message.

12. The method of claim 10, wherein the release of the SPS operation includes a release of a SPS C-RNTI, a sps-ConfigDL, and/or a sps-ConfigUL.

13. A method for handling reconfiguration messages in a wireless communication system, comprising:
transmitting a first reconfiguration message for a SPS (Semi-Persistent Scheduling) operation in a higher layer;
performing the SPS operation in a lower layer according to the first reconfiguration message; and
not transmitting a second reconfiguration message to reconfigure the SPS operation in the higher layer except under a predetermined condition, wherein the predetermined condition includes when the second reconfiguration message includes a release of the SPS operation despite of whether the second reconfiguration message, which includes the release of the SPS operation, is a handover message or not.

14. The method of claim 13, wherein the release of the SPS operation includes a release of a SPS C-RNTI, a sps-ConfigDL, and/or a sps-ConfigUL.

15. A user equipment (UE) for handling reconfiguration messages in a wireless communication system, the UE comprising:
a control circuit;
a processor installed in the control circuit;
a memory installed in the control circuit and operatively coupled to the processor;
wherein the processor is configured to execute a program code stored in memory to handle the reconfiguration messages by:
performing a specific operation in a lower layer;
receiving, at the UE, a reconfiguration message for the specific operation in a higher layer;
reconfiguring, at the UE, the specific operation based on the reconfiguration message if the reconfiguration message includes a release of the specific operation; and
ignoring, at the UE, the reconfiguration message if the reconfiguration message includes changes to parameters of the specific operation.

16. A network node for handling reconfiguration messages in a wireless communication system, the network node comprising:
a control circuit;
a processor installed in the control circuit;
a memory installed in the control circuit and operatively coupled to the processor;
wherein the processor is configured to execute a program code stored in memory to handle the reconfiguration messages by:
transmitting a first reconfiguration message for a SPS (Semi-Persistent Scheduling) operation in a higher layer;
performing the SPS operation in a lower layer according to the first reconfiguration message; and
transmitting a second reconfiguration message for the SPS operation in the higher layer, if the second reconfiguration message includes a release of the SPS operation despite of whether the second reconfiguration message, which includes the release of the SPS operation, is a handover message or not.

17. The network node of claim 16, wherein the processor is further configured to execute the program code stored in memory to handle the reconfiguration messages by:
stopping the SPS operation in the lower layer according to the second reconfiguration message.

18. The network node of claim 16, wherein the release of the SPS operation includes a release of a SPS C-RNTI, a sps-ConfigDL, and/or a sps-ConfigUL.

19. A network node for handling reconfiguration messages in a wireless communication system, the network node comprising:
- a control circuit;
- a processor installed in the control circuit;
- a memory installed in the control circuit and operatively coupled to the processor;
- wherein the processor is configured to execute a program code stored in memory to handle the reconfiguration messages by:
  - transmitting a first reconfiguration message for a SPS (Semi-Persistent Scheduling) operation in a higher layer;
  - performing the SPS operation in a lower layer according to the first reconfiguration message; and
  - not transmitting a second reconfiguration message to reconfigure the SPS operation in the higher layer except under a predetermined condition, wherein the predetermined condition includes when the second reconfiguration message includes a release of the SPS operation despite of whether the second reconfiguration message, which includes the release of the SPS operation, is a handover message or not.

20. The network node of claim 19, wherein the release of the SPS operation includes a release of a SPS C-RNTI, a sps-ConfigDL, and/or a sps-ConfigUL.

* * * * *